United States Patent
Choung

(10) Patent No.: US 10,161,281 B2
(45) Date of Patent: Dec. 25, 2018

(54) EXHAUST PURIFICATION SYSTEM AND CONTROL METHOD THEREOF

(71) Applicant: HYUNDAI MOTOR COMPANY, Seoul (KR)

(72) Inventor: Jin Woo Choung, Sunwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 69 days.

(21) Appl. No.: 15/362,321

(22) Filed: Nov. 28, 2016

(65) Prior Publication Data

US 2017/0167337 A1  Jun. 15, 2017

(30) Foreign Application Priority Data

Dec. 11, 2015 (KR) .................. 10-2015-0177109

(51) Int. Cl.
| | |
|---|---|
| *F01N 3/00* | (2006.01) |
| *F01N 9/00* | (2006.01) |
| *F01N 3/08* | (2006.01) |
| *F01N 3/20* | (2006.01) |
| *F01N 3/30* | (2006.01) |

(52) U.S. Cl.
CPC ............ *F01N 9/00* (2013.01); *F01N 3/0842* (2013.01); *F01N 3/0871* (2013.01); *F01N 3/2066* (2013.01); *F01N 3/30* (2013.01); *F01N 2270/00* (2013.01); *Y02A 50/2325* (2018.01); *Y02T 10/24* (2013.01); *Y02T 10/47* (2013.01)

(58) Field of Classification Search
USPC ......... 60/274, 276, 286, 295, 297, 301, 303, 60/290, 292
See application file for complete search history.

(56) References Cited

U.S. PATENT DOCUMENTS

| | | | |
|---|---|---|---|
| 7,334,400 B2 | 2/2008 | Yan et al. | |
| 7,814,747 B2 * | 10/2010 | Bandl-Konrad ... | B01D 53/9431 60/297 |
| 8,776,505 B2 * | 7/2014 | Lee .................... | F02D 41/0072 60/274 |
| 9,255,513 B2 * | 2/2016 | Surnilla .................. | F01N 3/22 |

(Continued)

FOREIGN PATENT DOCUMENTS

| | | |
|---|---|---|
| JP | 2013-238170 A | 11/2013 |
| KR | 10-2007-0037192 A | 4/2007 |

(Continued)

*Primary Examiner* — Binh Q Tran
(74) *Attorney, Agent, or Firm* — Brinks Gilson & Lione

(57) ABSTRACT

The present disclosure provides an exhaust purification system including: an engine; a lean NOx trap (LNT) mounted on an exhaust pipe and enable to absorb nitrogen oxide (NOx) contained in an exhaust gas at a lean air/fuel ratio, or to release the absorbed NOx at a rich air/fuel ratio; a selective catalytic reduction (SCR) catalyst provided downstream of the LNT so as to reduce the NOx contained in the exhaust gas; a controller to perform denitrification (DeNOx) by using the LNT and/or the SCR catalyst based on a driving condition of the engine; a first oxygen sensor disposed between the engine and the LNT to detect an oxygen amount in the exhaust gas; a second oxygen sensor disposed between the LNT and the SCR catalyst to detect an oxygen amount in the exhaust gas exhausted from the LNT; and an air injection device selectively injecting air into the exhaust pipe.

8 Claims, 4 Drawing Sheets

(56) References Cited

U.S. PATENT DOCUMENTS

| | | | |
|---|---|---|---|
| 9,453,443 B2* | 9/2016 | Kumar | B01D 53/9477 |
| 9,816,415 B2* | 11/2017 | Hokuto | F01N 3/0885 |
| 2012/0047879 A1 | 3/2012 | Ujihara et al. | |
| 2012/0192549 A1* | 8/2012 | Sakurai | F01N 3/0814 |
| | | | 60/285 |
| 2014/0311126 A1 | 10/2014 | Gandhi et al. | |

FOREIGN PATENT DOCUMENTS

| | | |
|---|---|---|
| KR | 10-1519276 B1 | 5/2015 |
| KR | 10-2015-0122935 A | 11/2015 |

\* cited by examiner

EXHAUST PURIFICATION SYSTEM AND CONTROL METHOD THEREOF

CROSS-REFERENCE TO RELATED APPLICATION

This application claims priority to and the benefit of Korean Patent Application No. 10-2015-0177109, filed on Dec. 11, 2015, the entire contents of which are incorporated herein by reference.

FIELD

The present disclosure relates to an exhaust purification system and a control method thereof.

BACKGROUND

The statements in this section merely provide background information related to the present disclosure and may not constitute prior art.

Generally, exhaust gas flowing out from an engine through an exhaust manifold is driven into a catalytic converter mounted at an exhaust pipe and is purified therein. After that, noise of the exhaust gas is decreased while passing through a muffler and then the exhaust gas is emitted into the atmosphere through a tail pipe. The catalytic converter purifies pollutants contained in the exhaust gas. In addition, a particulate filter for trapping particulate matter (PM) contained in the exhaust gas is mounted in the exhaust pipe.

A denitrification (DeNOx) catalyst is used in one type of such a catalytic converter, and purifies nitrogen oxide (NOx) contained in the exhaust gas. If reducing agents such as urea, ammonia, carbon monoxide, and hydrocarbons (HC) are supplied to the exhaust gas, the NOx contained in the exhaust gas is reduced by the DeNOx catalyst through an oxidation-reduction reaction with the reducing agents.

Recently, a lean NOx trap (LNT) catalyst has been used as such a DeNOx catalyst. The LNT catalyst absorbs the NOx contained in the exhaust gas when an air/fuel ratio is lean, and releases the absorbed NOx when the air/fuel ratio is rich, and reduces the released NOx and the NOx contained in the exhaust gas when the air/fuel ratio is rich (hereinafter called 'regeneration of the LNT').

Since general diesel engines are operated at a lean air/fuel ratio, however, it is required to artificially adjust the air/fuel ratio to be rich in order to release the absorbed NOx from the LNT. For this purpose, a time for releasing the NOx absorbed in the LNT (i.e., regeneration timing) should be accurately determined.

In addition, if a temperature of the exhaust gas is high (e.g., the temperature of the exhaust gas is higher than 400° C.), the LNT cannot remove the NOx contained in the exhaust gas. In order to solve such problems, a selective catalytic reduction (SCR) catalyst is used together with the LNT.

Here, when the air/fuel ratio of the engine is rich, the content of a non-combusted fuel that is included in the exhaust gas and passing through the LNT is increased. Accordingly, we have found that an oxygen concentration must be controlled to activate an oxidation-reduction reaction of a selective catalytic reduction (SCR) catalyst.

The above information disclosed in this Background section is only for enhancement of understanding of the background of the present disclosure and therefore it may contain information that does not form the prior art that is already known to a person of ordinary skill in the art.

SUMMARY

The present disclosure provides an exhaust purification system and a control method thereof having advantages of removing nitrogen oxide that is included in exhaust gas through activation of an oxidation-reduction reaction of a selective catalytic reduction (SCR) catalyst by controlling an oxygen concentration included in the exhaust gas upstream of the SCR catalyst when an air/fuel ratio of the engine is rich.

An exhaust purification system according to an exemplary form of the present disclosure may include: an engine including an injector configured to inject fuel, the engine configured to generate power by combusting a mixture of air and the fuel, and to exhaust an exhaust gas generated by the combusting to outside through an exhaust pipe; a lean NOx trap (LNT) mounted on the exhaust pipe, and configured to absorb nitrogen oxide (NOx) contained in the exhaust gas at a lean air/fuel ratio, to release the absorbed NO at a rich air/fuel ratio, and to reduce the nitrogen oxide contained in the exhaust gas or the released nitrogen oxide using a reductant including carbon or hydrogen contained in the exhaust gas; a selective catalytic reduction (SCR) catalyst mounted at the exhaust pipe downstream of the LNT and configured to reduce the NOx contained in the exhaust gas by passing through the LNT; a controller configured to perform denitrification (DeNOx) by using at least one of the LNT or the SCR catalyst based on a driving condition of the engine; a first oxygen sensor mounted on the exhaust pipe and disposed between the engine and the LNT, the first oxygen sensor configured to detect an oxygen amount in the exhaust gas exhausted from the engine; a second oxygen sensor mounted on the exhaust pipe and disposed between the LNT and the SCR catalyst, the second oxygen sensor configured to detect the oxygen amount in the exhaust gas discharged from the LNT; and an air injection device configured to selectively inject air to an inside of the exhaust pipe based on a control signal of the controller, the air injection device being disposed between the second oxygen sensor and the SCR catalyst.

The controller may operate the LNT so that a regeneration of the NOx is performed based on the oxygen amount contained in the exhaust gas detected by the first oxygen sensor.

The controller may operate the air injection device so as to selectively inject the air into the exhaust gas based on the oxygen amount in the exhaust gas detected by the second oxygen sensor.

A third oxygen sensor may be mounted on the exhaust pipe and disposed between the air injection device and the SCR catalyst, and the third oxygen sensor is configured to detect the oxygen amount contained in the exhaust gas which contains the air discharged from the air injection device and to transmit a signal corresponding to the oxygen amount to the controller.

The controller may control the air injection device so as to control an air injection amount based on the oxygen amount in the exhaust gas detected by the third oxygen sensor upstream of the SCR catalyst.

A control method of an exhaust purification system provided with the LNT and a selective catalytic reduction (SCR) catalyst according to an exemplary form of the present disclosure may include: driving a vehicle in an air injection driving mode; recognizing entering regeneration of NOx at the LNT, when a lambda value upstream of the LNT is smaller than 1; controlling an air injection amount upstream of the SCR catalyst by operating an air injection device, when a lambda value downstream of the LNT is smaller than 1; and determining whether the lambda value downstream of the LNT is more than 1.

The lambda value upstream of the LNT may be measured by a first oxygen sensor which is mounted on the exhaust pipe upstream of the LNT.

The lambda value downstream of the LNT may be measured by a second oxygen sensor which is mounted on the exhaust pipe at the downstream of the LNT.

The control method of the exhaust purification system may further include: determining whether a lambda value upstream of the SCR catalyst is equal to a predetermined value after controlling the air injection amount by operating the air injection device.

The lambda value upstream of the SCR catalyst may be measured by a third oxygen sensor which is mounted on the exhaust pipe upstream of the SCR catalyst.

The predetermined value may be approximately from 1.002 to 1.457.

The present disclosure has been made in an effort to provide an exhaust purification system and control method thereof such that purification efficiency of the NOx may be improved through activating of the oxidation-reduction reaction of the SCR catalyst by controlling a concentration of oxygen contained in the exhaust gas upstream of a selective catalytic reduction (SCR) catalyst when an air/fuel ratio of an engine is rich.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
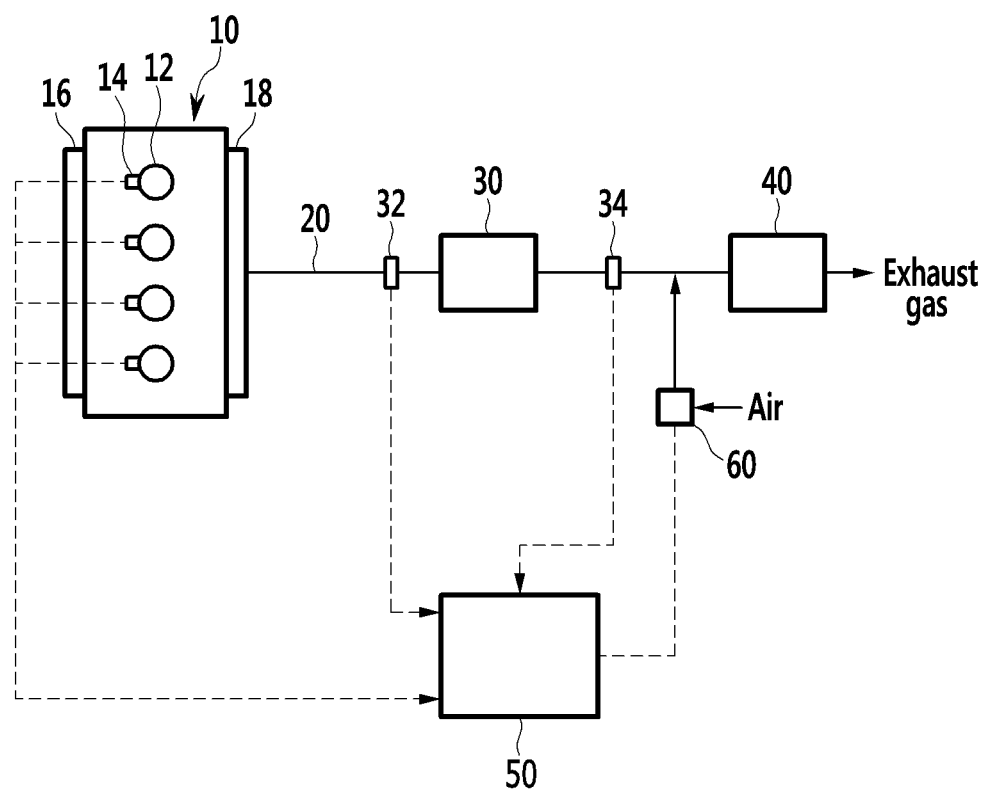
FIG. 1 is a schematic diagram of an exhaust purification system according to one form of the present disclosure.

The drawings described herein are for illustration purposes only and are not intended to limit the scope of the present disclosure in any way.

DESCRIPTION OF SYMBOLS

10: engine
20: exhaust pipe
30: lean NOx trap (LNT)
40: selective catalytic reduction (SCR) catalyst
50: controller
60: air injection device

DETAILED DESCRIPTION

The following description is merely exemplary in nature and is not intended to limit the present disclosure, application, or uses. It should be understood that throughout the drawings, corresponding reference numerals indicate like or corresponding parts and features.

First, since the exemplary form described in the specification and the configurations shown in the drawings are merely the exemplary form and configurations of the present disclosure, they do not represent all of the technical ideas of the present disclosure, and it should be understood that that various equivalents and modified examples, which may replace the exemplary forms, are possible.

In order to clearly describe the present disclosure, parts that are irrelevant to the description are omitted, and identical or similar constituent elements throughout the present disclosure are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Moreover, throughout the present disclosure, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the present disclosure mean a unit of a comprehensive configuration having at least one function or operation.

FIG. 1 is a schematic diagram of an exhaust purification system according to an exemplary form of the present disclosure.

As shown in FIG. 1, an exhaust system of an internal combustion engine includes an engine 10, an exhaust pipe 20, a lean NOx trap (LNT) 30, a selective catalytic reduction (SCR) catalyst 40, and a controller 50.

The engine 10 burns an air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in a combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at an upper portion of the combustion chamber 12.

The exhaust pipe 20 is connected to the exhaust manifold 18 so as to exhaust the exhaust gas to the exterior of the vehicle. The LNT 30 and the SCR catalyst 40 are mounted on the exhaust pipe 20 so as to remove hydrocarbons, carbon monoxide, particulate matter, and nitrogen oxide (NOx) contained in the exhaust gas.

A first oxygen sensor 32 is mounted on the exhaust pipe 20 downstream between the engine 10 and the LNT 30. The first oxygen sensor 32 detects an oxygen amount in the exhaust gas exhausted from the engine 10, and transmits a signal corresponding thereto to the controller 50 so as to help lean/rich control of the exhaust gas performed by the controller 50. In this present disclosure, the detected value by the first oxygen sensor 72 is called a lambda value upstream of the LNT.

The LNT 30 is mounted on the exhaust pipe 20 downstream of the engine 10. The LNT 30 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT 30 may oxidize carbon monoxide (CO) and hydrocarbons (HC) contained in the exhaust gas.

Herein, the hydrocarbons represent all compounds consisting of carbon and hydrogen contained in the exhaust gas and the fuel.

A second oxygen sensor 34 is mounted on the exhaust pipe 20 downstream of the LNT 30. The second oxygen sensor 34 detects the oxygen amount contained in exhaust gas flowing into the SCR catalyst 40 and transmits a signal corresponding thereto to the controller 50.

The controller 50 may perform the lean/rich control of the exhaust gas based on the values detected by the first oxygen sensor 32 and the second oxygen sensor 34. In this present disclosure, the value detected by the second oxygen sensor 34 is called a lambda value downstream of the LNT.

The SCR catalyst 40 is mounted on the exhaust pipe 20 downstream of the LNT 30, and reduces the nitrogen oxide contained in the exhaust gas by using the reducing agent including carbon, hydrogen, nitrogen or oxygen and being generated or not oxidized from the LNT 30.

The controller 50 determines a driving condition of the engine, and performs the lean/rich control and controls the amount of the reducing agent injected by the dosing module based on the driving condition of the engine. For example, the controller 50 may release the NOx from the LNT 30 by controlling the air/fuel ratio to be rich and may reduce the released NOx by using a reductant contained in the exhaust gas (in this present disclosure, this will be called 'regeneration of the LNT'). In addition, the controller 50 may remove the NOx at the SCR catalyst 40 by using the reducing agent being generated or not oxidized from the LNT 30. The lean/rich control may be performed by controlling a fuel amount injected by the injector 14.

Here, the controller 50 operates the LNT 30 in order for the regeneration of the NOx (i.e., regeneration of the LNT) to be performed according to the oxygen amount contained in the exhaust gas through a signal detected by the first oxygen sensor 32.

An air injection device 60 may selectively inject air to the inside of the exhaust pipe 20 between the second oxygen sensor 34 and the SCR catalyst 40 when it receives a control signal of the controller 50.

Accordingly, the controller 50 selectively operates the air injection device 60 in order for the air to be injected into the exhaust gas before flowing into the SCR catalyst 40 when the lambda value downstream of the LNT is lower than the predetermined value based on the oxygen amount in the exhaust gas read from the signal transmitted from the second oxygen sensor 34.

A plurality of maps, characteristics of the LNT, and/or correction coefficients enable the controller 50 to determine regeneration start timing and regeneration end timing. The plurality of maps, characteristics of the LNT, and correction coefficients may be set through a number of experiments.

The controller 50 can be in a form of one or more processors activated by a predetermined program, and the predetermined program can be programmed to perform each step of a method of regenerating the LNT.

The first oxygen sensor 32 and the second oxygen sensor 34 are electrically connected to the controller 50, and transmit the detected values to the controller 50.

The first oxygen sensor 32 detects the oxygen amount in the exhaust gas and transmits the signal corresponding thereto to the controller 50. The controller 50 may perform the lean/rich control of the exhaust gas based on the oxygen amount in the exhaust gas detected by the first oxygen sensor 32. The detected value by the first oxygen sensor 32 may be represented as a lambda (λ) value. The lambda value represents a ratio of an actual air/fuel ratio to a stoichiometric air/fuel ratio. If the lambda value is greater than 1, the air/fuel ratio is lean, whereas the air/fuel ratio is rich if the lambda value is smaller than 1.

The second oxygen sensor 34 detects the oxygen amount in the exhaust gas exhausting from the LNT 30 and transmits the signal corresponding thereto to the controller 50.

A plurality of sensors other than the sensors illustrated in FIG. 1 may be mounted in the exhaust purification device. For better comprehension and ease of description, however, description of the plurality of other sensors will be omitted.

Hereinafter, referring to FIG. 2, a control method of an exhaust purification system according to an exemplary form of the present disclosure will be described in detail.

Figure 2:
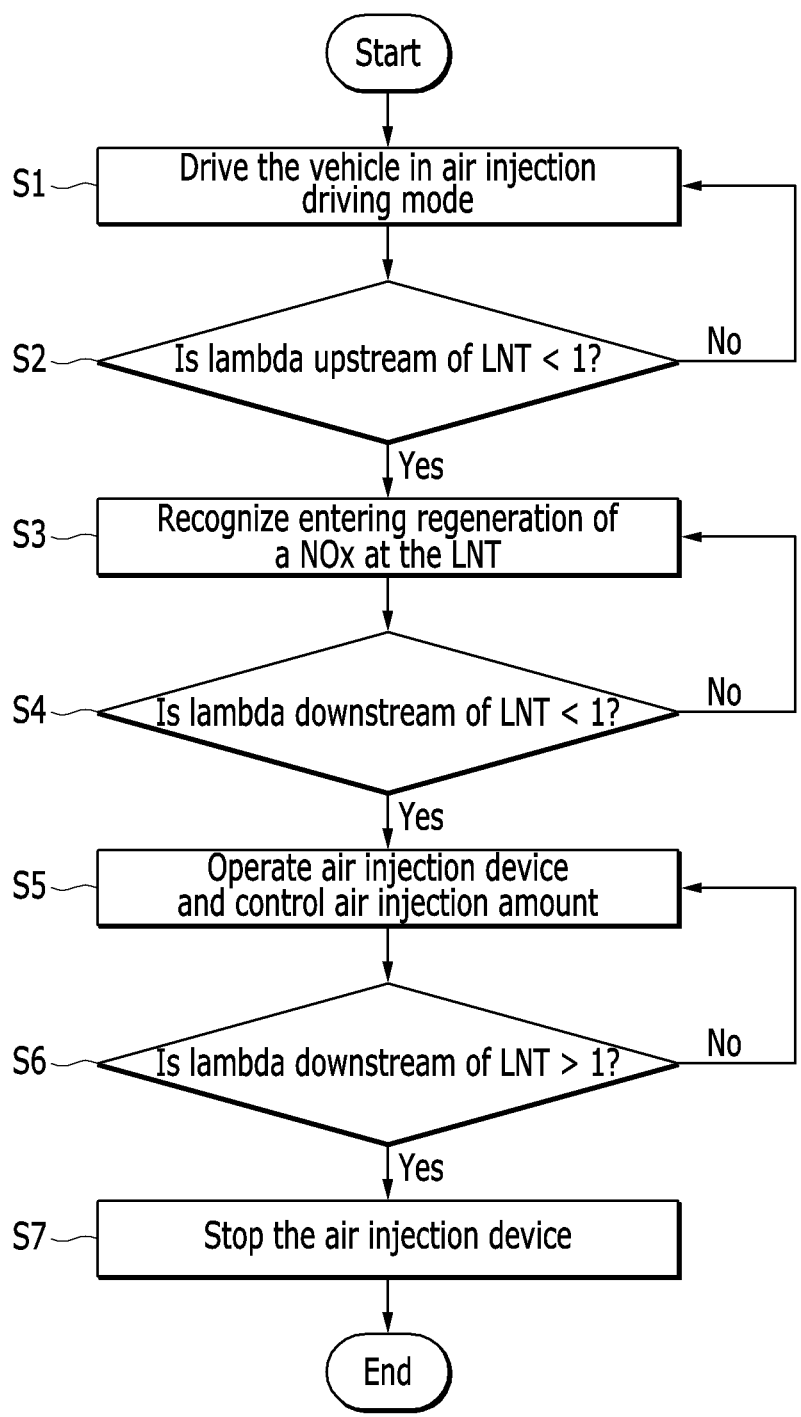
FIG. 2 is a flowchart of a control method of an exhaust purification system according to one form of the present disclosure.

FIG. 2 is a flowchart of a control method of an exhaust purification system according to an exemplary form of the present disclosure.

As shown in FIG. 2, the control method of an exhaust purification system according to the exemplary form of the present disclosure is performed when the vehicle drives. If the vehicle is started, the controller 50 controls the engine 10 to be operated in an air injection mode at step S1.

The controller 50 receives an input of the oxygen amount in the exhaust gas from the first oxygen sensor 32, and determines whether the lambda value upstream of the LNT is smaller than 1 at step S2.

In step S2, when it is determined that the lambda value upstream of the LNT is smaller than 1, the controller 50 recognizes entering the regeneration of NOx at the LNT 30, at step S3.

That is, the LNT 30 releases the absorbed the NOx, and performs the regenerating of the LNT which reduces the released nitrogen oxide and the nitrogen oxide contained in the exhaust gas.

In contrast, when the controller 50 determines that the lambda value upstream of the LNT is not smaller than 1 (that is, when a condition is not met), the controller 50 returns to step S1 of driving the vehicle in an air injection driving mode.

At step S4, the controller 50 receives an input of the oxygen amount in the exhaust gas passed through the LNT 30 from the second oxygen sensor 34, and determines whether the lambda value downstream of the LNT is smaller than 1.

When it is determined that the lambda value downstream of the LNT is smaller than 1, the controller 50 controls an air injection amount upstream of the SCR catalyst 40 by operating the air injection device 60 at step S5.

Accordingly, the oxygen amount in the exhaust gas is increased before flowing into the SCR catalyst 40, and the oxidation-reduction reaction may be activated in the SCR catalyst 40.

In contrast, when the controller 50 determines that the lambda value downstream of the LNT is more than 1 (that is, when a condition is not met), the controller 50 returns to step S3 of recognizing entering regeneration of NOx at the LNT 30.

Then, the controller 50 receives an input of the oxygen amount in the exhaust gas passed through the LNT 30 from the second oxygen sensor 34, and determines whether the lambda value downstream of the LNT is more than 1 at step S6.

In step S6, when it is determined that the lambda value downstream of the LNT is more than 1, the controller 50 stops actuation of the air injection device 60 at step S7 and the control is ended.

In contrast, when the controller 50 determines that the lambda value downstream of the LNT is smaller than 1 (that is, when a condition is not met), the controller 50 returns to step S5 of controlling an air injection amount by operating the air injection device 60.

In particular, the control method of the exhaust purification system according to the present disclosure has advantages of removing nitrogen oxide that is included in exhaust gas by activating the oxidation-reduction reaction in the SCR catalyst 40 through controlling an oxygen concentration included in the exhaust gas when the air/fuel ratio of the engine is rich.

Figure 3:
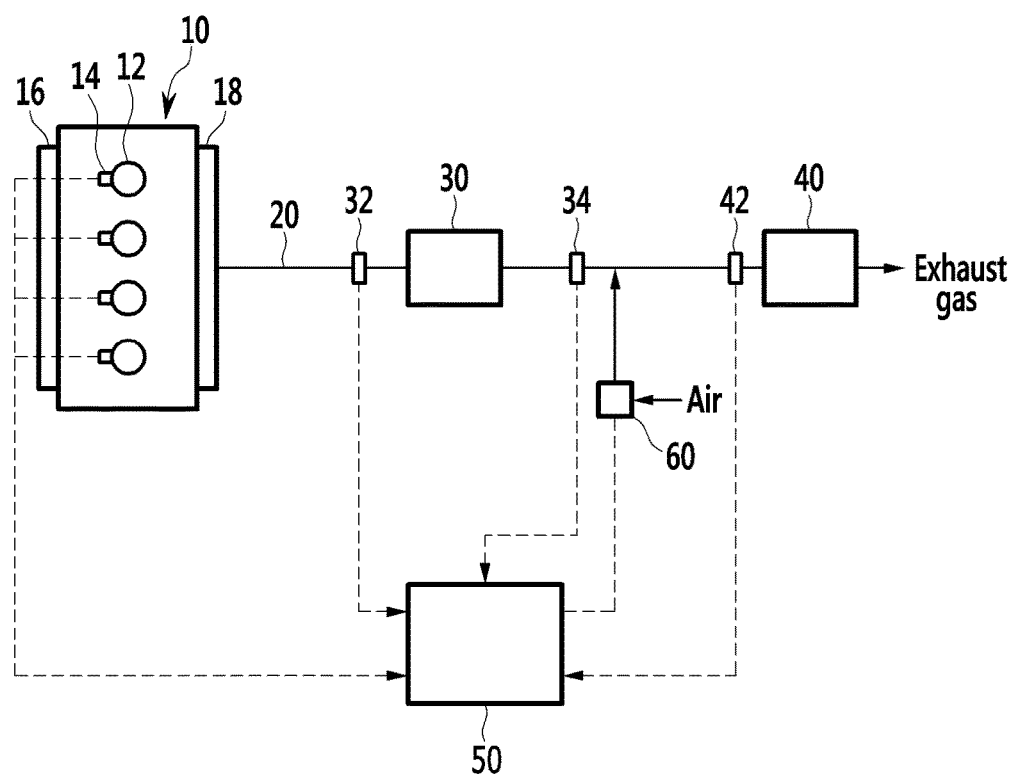
FIG. 3 is a schematic diagram of an exhaust purification system according to another form of the present disclosure.

FIG. 3 is a schematic diagram of an exhaust purification system according to another exemplary form of the present disclosure.

As shown in FIG. 3, an exhaust system of an internal combustion engine includes: an engine 10, an exhaust pipe 20, a lean NOx trap (LNT) 30, a selective catalytic reduction (SCR) catalyst 40, and a controller 50.

The engine 10 burns an air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that exhaust gas generated in a combustion process is gathered in the exhaust manifold 18 and is discharged to outside. An injector 14 is mounted in the combustion chamber 12 so as to inject the fuel into the combustion chamber 12.

As an exemplary form, a diesel engine is described, but a lean-burn gasoline engine may be used in another form. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at an upper portion of the combustion chamber 12.

The exhaust pipe 20 is connected to the exhaust manifold 18 so as to discharge the exhaust gas to outside of the vehicle. The LNT 30 and the SCR catalyst 40 are mounted on the exhaust pipe 20 so as to remove hydrocarbons, carbon monoxide, particulate matter, and nitrogen oxide (NOx) contained in the exhaust gas.

A first oxygen sensor 32 is mounted on the exhaust pipe 20 downstream between the engine 10 and the LNT 30. The first oxygen sensor 32 detects an oxygen amount in the exhaust gas exhausted from the engine 10, and transmits a signal corresponding to the amount of the oxygen to the controller 50 so as to help lean/rich control of the exhaust gas performed by the controller 50. In this present disclosure, the detected value by the first oxygen sensor 72 is called a lambda value upstream of the LNT.

The LNT 30 is mounted on the exhaust pipe 20 downstream of the engine 10. The LNT 30 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT 30 may oxidize carbon monoxide (CO) and hydrocarbons (HC) contained in the exhaust gas.

Herein, the hydrocarbons represent all compounds consisting of carbon and hydrogen contained in the exhaust gas and the fuel.

A second oxygen sensor 34 is mounted on the exhaust pipe 20 downstream of the LNT 30. The second oxygen sensor 34 detects the oxygen amount contained in exhaust gas flowing into the SCR catalyst 40, and transmits a signal corresponding to the amount of oxygen to the controller 50.

The controller 50 may perform the lean/rich control of the exhaust gas based on the values detected by the first oxygen sensor 32 and the second oxygen sensor 34. In this present disclosure, the value detected by the second oxygen sensor 34 is called a lambda value downstream of the LNT.

The SCR catalyst 40 is mounted on the exhaust pipe 20 downstream of the LNT 30, and reduces the nitrogen oxide contained in the exhaust gas by using the reducing agent including carbon, hydrogen, nitrogen or oxygen and being generated or not oxidized from the LNT 30.

The controller 50 determines a driving condition of the engine, and performs the lean/rich control and controls the amount of the reducing agent injected by the dosing module based on the driving condition of the engine. For example, the controller 50 may release the NOx from the LNT 30 by controlling the air/fuel ratio to be rich, and may reduce the released NOx by using reductant contained in the exhaust gas (in this present disclosure, this will be called 'regeneration of the LNT'). In addition, the controller 50 may remove the NOx at the SCR catalyst 40 by using the reducing agent being generated or not oxidized from the LNT 30. The lean/rich control may be performed by controlling a fuel amount injected by the injector 14.

Here, the controller 50 operates the LNT 30 in order for the regeneration of the NOx (i.e., regeneration of the LNT) to be performed according to the oxygen amount contained in the exhaust gas through a signal detected from the first oxygen sensor 32.

An air injection device 60 may selectively inject air to the inside of the exhaust pipe 20 between the second oxygen sensor 34 and the SCR catalyst 40 when it receives a control signal of the controller 50.

Accordingly, the controller 50 selectively operates the air injection device 60 in order for the air to be injected into the exhaust gas before flowing into the SCR catalyst 40 when the lambda value downstream of the LNT is lower than the predetermined value according to the oxygen amount in the exhaust gas through the signal detected by the second oxygen sensor 34.

Here, a third oxygen sensor 42 may be mounted on the exhaust pipe 20 disposed between the air injection device 60 and the SCR catalyst 40. The third oxygen sensor 42 detects the oxygen amount contained in the exhaust gas which contains the air from the air injection device 60.

In particular, the third oxygen sensor 42 detects the oxygen amount contained in the exhaust gas upstream of the SCR catalyst 40 and transmits a signal corresponding to the amount of oxygen to the controller 50.

The controller 50 controls the air injection device 60 so as to control an air injection amount based on the oxygen amount in the exhaust gas detected from the third oxygen sensor 43 upstream of the SCR catalyst 40.

The controller 50 may perform the lean/rich control of the exhaust gas based on the detected values by the first, second, and third oxygen sensors 32, 34, and 42. In the present disclosure, the value detected by the third oxygen sensor 42 is called a lambda value upstream of the SCR catalyst.

The controller 50 is provided with a plurality of maps, characteristics of the LNT, and correction coefficients, and thus it may determine regeneration start timing and regeneration end timing based them. The plurality of maps, characteristics of the LNT, and correction coefficients may be set through a number of experiments.

The controller 50 may be in a form of one or more processors activated by a predetermined program, and the predetermined program can be programmed to perform each step of a method of regenerating the LNT according to an exemplary form of the present disclosure.

The first, second, and third oxygen sensors 32, 34, and 42 are electrically connected to the controller 50, and transmit the detected values to the controller 50.

The first oxygen sensor 32 detects the oxygen amount in the exhaust gas and transmits the signal corresponding to the amount to the controller 50. The controller 50 may perform the lean/rich control of the exhaust gas based on the oxygen amount in the exhaust gas detected by the first oxygen sensor 32. The detected value by the first oxygen sensor 32 may be represented as a lambda (λ) value. The lambda value means a ratio of an actual air/fuel ratio to a stoichiometric air/fuel ratio. If the lambda value is greater than 1, the air/fuel ratio is referred to as "lean", while the air/fuel ratio is referred to as "rich" if the lambda is smaller than 1.

The second oxygen sensor 34 detects the oxygen amount in the exhaust gas exhausting from the LNT 30 and transmits the signal corresponding to the oxygen amount to the controller 50. The third oxygen sensor 42 detects the oxygen amount contained in the exhaust gas which contains the air injected by the air injection device 60 and transmits a signal corresponding to the oxygen amount to the controller 50.

A plurality of sensors other than the sensors illustrated in FIG. 3 may be mounted in the exhaust purification device in other form. For better comprehension and ease of description, however, description of the plurality of other sensors will be omitted.

Hereinafter, referring to FIG. 4, a control method of an exhaust purification system according to another form of the present disclosure will be described in detail.

Figure 4:
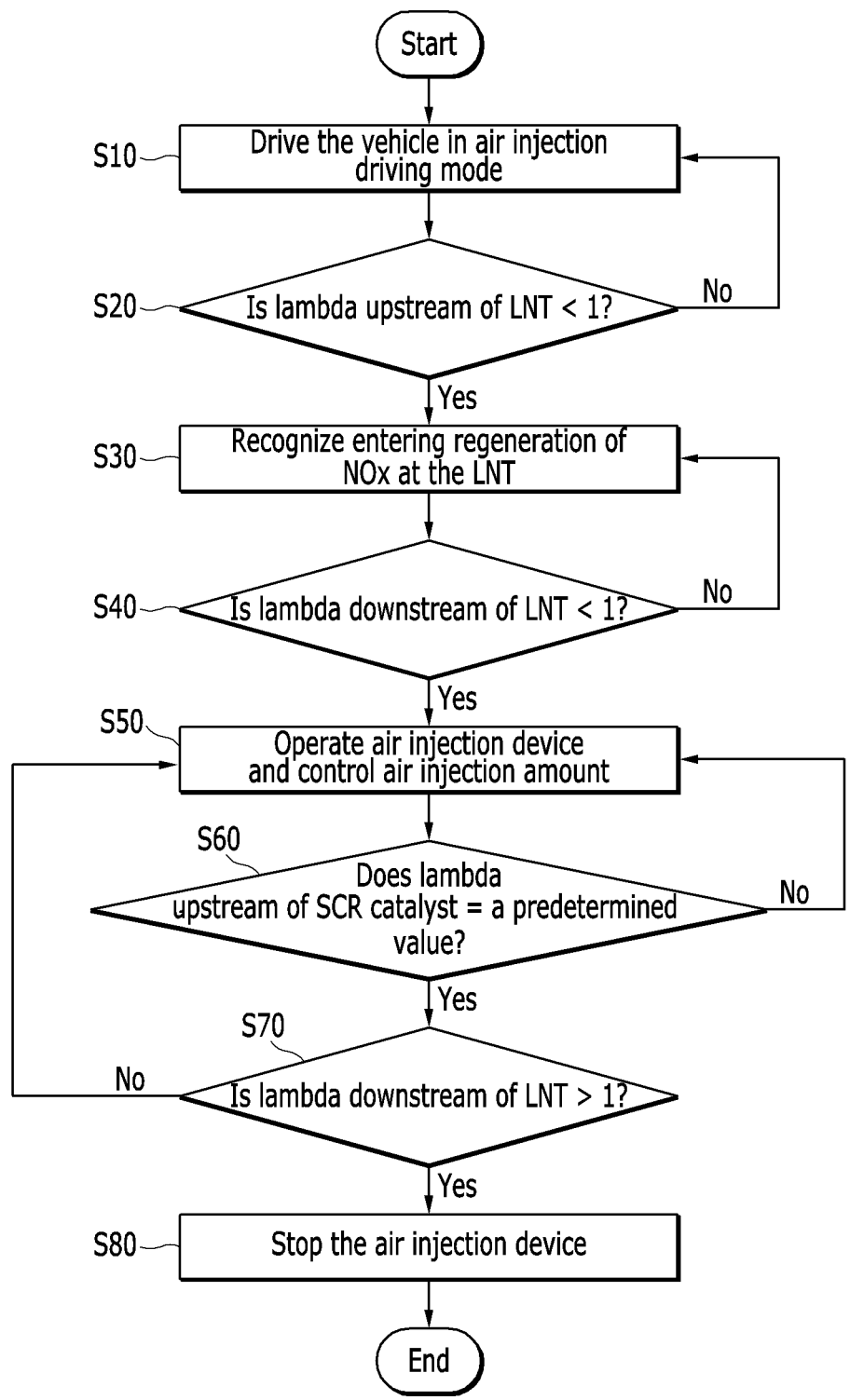
FIG. 4 is a flowchart of a control method of an exhaust purification system according to another form of the present disclosure.

FIG. 4 is a flowchart of a control method of the exhaust purification system.

As shown in FIG. 4, the control method of the exhaust purification system is performed when the vehicle drives. If the vehicle is started, the controller 50 controls the engine 10 to be operated in an air injection mode at step S10.

The controller 50 receives an input of the oxygen amount in the exhaust gas exhausted from the engine 10 from the first oxygen sensor 32, and determines whether the lambda value upstream of the LNT is smaller than 1 at step S20.

In step S20, when it is determined that the lambda value upstream of the LNT is smaller than 1, the controller 50 recognizes entering the regeneration of NOx at the LNT 30, at step S30.

More specifically, the LNT 30 releases the absorbed NOx, and performs the regenerating of the LNT which reduces the released nitrogen oxide and the nitrogen oxide contained in the exhaust gas.

In contrast, when the controller 50 determines the lambda value upstream of the LNT is not smaller than 1 (that is, when a condition is not met), the controller 50 returns to step S10 of driving the vehicle in an air injection driving mode.

Then, the controller 50 receives an input of the oxygen amount in the exhaust gas passed through the LNT 30 from the second oxygen sensor 34, and determines whether the lambda value downstream of the LNT is smaller than 1 at step S40.

In step S40, when it is determined that the lambda value downstream of the LNT is smaller than 1, the controller 50 controls an air injection amount upstream of the SCR catalyst 40 by operating an air injection device 60 at step S50.

As such, the oxygen amount in the exhaust gas is increased before flowing into the SCR catalyst 40 and the oxidation-reduction reaction may be activated in the SCR catalyst 40.

In contrast, when the controller 50 determines that the lambda value downstream of the LNT is not smaller than 1 (that is, when a condition is not met), the controller 50 returns to step S30 of recognizing entering regeneration of NOx at the LNT 30.

In another form, the controller 50 determines whether the lambda value upstream of the SCR catalyst is equivalent to a predetermined value at step 60 after the air injection amount by operating the air injection device 60 is controlled at step 50.

Here, the lambda value upstream of the SCR catalyst is detected through the third oxygen sensor 42 mounted on the exhaust pipe 20 upstream of the SCR catalyst 40. The third oxygen sensor 42 detects the oxygen amount contained in the exhaust gas which contains the air from the air injection device 60, and transmits a signal corresponding to the oxygen amount to the controller 50.

The predetermined value may be a range, from approximately 1.002 to 1.457, and in one form, the predetermined value may be approximately 1.236.

In particular, in step S60, when it is determined that the lambda value upstream of the SCR catalyst is equal to a predetermined value, the controller 50 receives an input of the oxygen amount in the exhaust gas passed through the LNT 30 from the second oxygen sensor 34, and determines whether the lambda value downstream of the LNT is more than 1 at step S70.

Meanwhile, when the controller 50 determines the lambda value upstream of the SCR catalyst is not a predetermined value (that is, when a condition is not met), the controller 50 returns to step S50 of controlling an air injection amount by operating the air injection device 60.

In step S70, when it is determined that the lambda value downstream of the LNT is more than 1, the controller 50 stops the actuation of the air injection device 60 at step S80 and the control is ended.

In contrast, when the controller 50 determines that the lambda value downstream of the LNT is not greater than 1 (that is, when a condition is not met), the controller 50 returns to step S50 of controlling an air injection amount by operating the air injection device 60.

That is, the method of the exhaust purification system according to the another exemplary form, when the air/fuel ratio of the engine is rich, may repeat the above-described process, and has advantages of removing nitrogen oxide that is included in exhaust gas by activating the oxidation-reduction reaction in the SCR catalyst 40 through controlling an oxygen concentration included in exhaust gas.

As described above, when the air/fuel ratio of an engine is rich, purification efficiency of the NOx may be improved by controlling an oxygen concentration contained in the exhaust gas upstream of a selective catalytic reduction (SCR) catalyst so that the oxidation-reduction reaction of the SCR catalyst may be activated.

While the present disclosure has been described in connection with what is presently considered to be practical exemplary forms, it should be understood that the present disclosure is not limited to the disclosed forms, but, on the contrary, is intended to cover various modifications and equivalent arrangements included within the spirit and scope of the present disclosure.

What is claimed is:

1. An exhaust purification system comprising:
an engine including an injector configured to inject fuel, the engine configured to generate power by combusting a mixture of air and the fuel, and to exhaust an exhaust gas generated by the combustion through an exhaust pipe;
a lean NOx trap (LNT) mounted on the exhaust pipe, and configured to absorb nitrogen oxide (NOx) contained in the exhaust gas at a lean air/fuel ratio, to release the absorbed NO at a rich air/fuel ratio, and to reduce the nitrogen oxide contained in the exhaust gas or the released nitrogen oxide using a reductant including carbon or hydrogen contained in the exhaust gas;
a selective catalytic reduction (SCR) catalyst mounted at the exhaust pipe downstream of the LNT and configured to reduce the NOx contained in the exhaust gas by passing through the LNT;
a controller configured to perform denitrification (De-NOx) by using at least one of the LNT or the SCR catalyst based on a driving condition of the engine;
a first oxygen sensor mounted on the exhaust pipe and disposed between the engine and the LNT, the first oxygen sensor configured to detect an oxygen amount in the exhaust gas exhausted from the engine;
a second oxygen sensor mounted on the exhaust pipe and disposed between the LNT and the SCR catalyst, the second oxygen sensor configured to detect the oxygen amount in the exhaust gas discharged from the LNT;
an air injection device configured to selectively inject air to an inside of the exhaust pipe based on a control signal of the controller, the air injection device being disposed between the second oxygen sensor and the SCR catalyst, and
a third oxygen sensor mounted on the exhaust pipe and disposed between the air injection device and the SCR catalyst,
wherein the third oxygen sensor is configured to detect the oxygen amount contained in the exhaust gas which contains the air discharged from the air injection device and to transmit a signal corresponding to the oxygen amount to the controller.

2. The exhaust purification system of claim 1, wherein the controller is configured to operate the LNT so that a regeneration of the NOx is performed based on the oxygen amount contained in the exhaust gas detected by the first oxygen sensor.

3. The exhaust purification system of claim 1, wherein the controller is configured to operate the air injection device so as to selectively inject the air into the exhaust gas based on the oxygen amount in the exhaust gas detected by the second oxygen sensor.

4. The exhaust purification system of claim 1, wherein the controller is configured to control the air injection device so as to control an air injection amount based on the oxygen amount in the exhaust gas detected by the third oxygen sensor upstream of the SCR catalyst.

5. A control method of an exhaust purification system provided with a lean NOx trap (LNT) and a selective catalytic reduction (SCR) catalyst, the control method comprising:
driving a vehicle in an air injection driving mode;
recognizing entering regeneration of nitrogen oxide (NOx) at the LNT, when a lambda value upstream of the LNT is smaller than 1;
controlling an air injection amount upstream of the SCR catalyst by operating an air injection device, when a lambda value downstream of the LNT is smaller than 1;
determining whether a lambda value downstream of the LNT is more than 1; and
determining whether a lambda value upstream of the SCR catalyst is equal to a predetermined value after controlling the air injection amount by operating the air injection device,
wherein the lambda value upstream of the SCR catalyst is measured by a third oxygen sensor which is mounted on an exhaust pipe upstream of the SCR catalyst,
wherein the third oxygen sensor is disposed between the air injection device and the SCR catalyst, and configured to detect an oxygen amount contained in the exhaust gas which contains the air discharged from the air injection device.

6. The control method of claim 5, wherein the lambda value upstream of the LNT is measured by a first oxygen sensor which is mounted on an exhaust pipe upstream of the LNT.

7. The control method of claim 5, wherein the lambda value downstream of the LNT is measured by a second oxygen sensor which is mounted on an exhaust pipe downstream of the LNT.

8. The control method of claim 5, wherein the predetermined value is approximately from 1.002 to 1.457.

* * * * *